(12) United States Patent
Goers et al.

(10) Patent No.: US 11,795,287 B2
(45) Date of Patent: *Oct. 24, 2023

(54) PORE INDUCER AND POROUS ABRASIVE FORM MADE USING THE SAME

(71) Applicant: 3M INNOVATIVE PROPERTIES COMPANY, St. Paul, MN (US)

(72) Inventors: Brian D. Goers, Minneapolis, MN (US); Mark A. Lukowski, St. Paul, MN (US); Walter Flaschberger, Almblickweg (AT); Ernest L. Thurber, Somerset, WI (US); John E. Gozum, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/304,653

(22) Filed: Jun. 24, 2021

(65) Prior Publication Data

US 2021/0317282 A1  Oct. 14, 2021

Related U.S. Application Data

(63) Continuation of application No. 16/099,728, filed as application No. PCT/US2017/032111 on May 11, 2017, now Pat. No. 11,078,345.

(Continued)

(51) Int. Cl.
*C08J 9/26* (2006.01)
*B24D 18/00* (2006.01)
(Continued)

(52) U.S. Cl.
CPC .................... *C08J 9/26* (2013.01); *B24D 3/10* (2013.01); *B24D 3/18* (2013.01); *B24D 3/32* (2013.01);
(Continued)

(58) Field of Classification Search
None
See application file for complete search history.

(56) References Cited

U.S. PATENT DOCUMENTS 4,001,981 A * 1/1977 Wood .................. B24D 7/02
51/298
4,115,077 A  9/1978 Fukuda
(Continued)

FOREIGN PATENT DOCUMENTS

JP  2002079468  3/2002

OTHER PUBLICATIONS

Extended EP Search Report, EP 17799898.6, dated Dec. 11, 2019 (8 pages).
International Search Report for PCT International Application No. PCT/US2017/032111, dated Jul. 11, 2017, 5 pages.

*Primary Examiner* — Stephen E Rieth
(74) *Attorney, Agent, or Firm* — Katherine M. Scholz (57) ABSTRACT

Various embodiments disclosed relate to pore inducers and porous abrasive forms made using the same. In various embodiments, the present invention provides a method of forming a porous abrasive form including heating an abrasive composition including pore inducers to form the porous abrasive form. During the heating the pore inducers in the porous abrasive form reduce in volume to form induced pores in the porous abrasive form.

8 Claims, 5 Drawing Sheets

Related U.S. Application Data (60) Provisional application No. 62/339,546, filed on May 20, 2016.

(51) Int. Cl.
  *B24D 3/10* (2006.01)
  *B24D 3/18* (2006.01)
  *B24D 3/32* (2006.01)
  *C08F 20/00* (2006.01)
  *C08F 122/14* (2006.01)

(52) U.S. Cl.
  CPC ......... *B24D 18/00* (2013.01); *B24D 18/0009* (2013.01); *C08F 20/00* (2013.01); *C08F 122/14* (2013.01); *C08J 2201/042* (2013.01); *C08J 2201/0442* (2013.01); *C08J 2205/10* (2013.01); *C08J 2333/00* (2013.01); *C08J 2335/02* (2013.01)

(56) References Cited

U.S. PATENT DOCUMENTS

| | | | |
|---|---|---|---|
| 5,203,886 A * | 4/1993 | Sheldon | C09K 3/1418 51/307 |
| 5,472,461 A * | 12/1995 | Li | B24D 3/14 51/296 |
| 5,536,283 A * | 7/1996 | Sheldon | C04B 35/111 51/308 |
| 5,658,360 A | 8/1997 | Keil | |
| 10,350,732 B2 * | 7/2019 | Lukowski | B24D 3/18 |
| 2001/0018324 A1 | 8/2001 | Ito | |
| 2003/0194954 A1 | 10/2003 | Saint Gobain et al. | |
| 2005/0101225 A1 | 5/2005 | Bright et al. | |
| 2008/0222967 A1 * | 9/2008 | Querel | B24D 3/18 51/307 |
| 2009/0258588 A1 * | 10/2009 | Hsu | B24D 3/26 451/527 |
| 2010/0154315 A1 * | 6/2010 | Wu | B24D 18/00 51/296 |

* cited by examiner

PORE INDUCER AND POROUS ABRASIVE FORM MADE USING THE SAME

CROSS REFERENCE TO RELATED APPLICATIONS

This application is a Divisional of U.S. application Ser. No. 16/099,728, filed Nov. 8, 2018, which is a national stage filing under 35 U.S.C. 371 of PCT/US2017/032111, filed May 11, 2017, which claims the benefit of U.S. Provisional Application No. 62/339,546, filed May 20, 2016, the disclosures of which are incorporated by reference in their entireties herein.

BACKGROUND

A typical way to create porosity in a vitrified grinding wheel is to blend in randomly-shaped naphthalene particles into a mixture of abrasive, glass frit, temporary binders, and water. The mix is pressed in a steel mold to the desired shape. The abrasive wheel or form is then placed into a low temperature oven to sublime out the naphthalene and harden the temporary binder. The wheel or form is then placed into a furnace to vitrify the bond (e.g., 700-1100° C.). The resulting wheel has a very porous structure that is desired for certain grinding applications. The pores aid in chip and swarf removal during the grinding operation as well as help transport coolant to the grinding zone. However, naphthalene is toxic and is subject to environmental regulations.

SUMMARY OF THE INVENTION

In various embodiments, the present invention provides a method of forming a porous abrasive form. The method includes heating an abrasive composition including pore inducers, to form the porous abrasive form. During the heating the pore inducers in the porous abrasive form reduce in volume to form induced pores in the porous abrasive form.

In various embodiments, the present invention provides a method of forming a porous vitreous abrasive form. The method includes heating an abrasive composition including pore inducers including hollow glass filler, to form the porous vitreous abrasive form. During the heating the pore inducers in the porous vitreous abrasive form reduce in volume to form induced pores in the porous vitreous abrasive form.

In various embodiments, the present invention provides a porous abrasive form. The porous abrasive form includes pore inducers that have reduced in volume to form induced pores in the porous abrasive form.

In various embodiments, the present invention provides a pore inducer. Upon heating within a medium the pore inducer reduces in volume in the medium to form an induced pore in the medium.

In various embodiments, the present invention can provide certain advantages over other porous abrasive forms, pore inducers, and methods of using the same, at least some of which are unexpected. In various embodiments, the pore inducers of the present invention can form a porous abrasive form from an abrasive composition with less or no use of naphthalene. In various embodiments, the pore inducers of the present invention can release less or no toxic materials during pore formation, as compared to other processes including the use of naphthalene. In various embodiments, the pore inducers of the present invention can provide better control over the size of induced pores, the shape of induced pores, or a combination thereof, as compared to other methods of forming pores, such as methods including the use of naphthalene. In various embodiments, the pore inducers of the present invention can provide pores of a controlled shape and size without the typical distributions inherent to using pore-forming materials not derived from a mold. In some embodiments, the porous abrasive form of the present invention has better characteristics than other porous abrasive forms, such as better abrasive capabilities, better coolant flow, more customizable abrasive capabilities, longer service life, or a combination thereof.

BRIEF DESCRIPTION OF THE FIGURES

The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "resin" as used herein refers to a curable material, such as a polymer that can be crosslinked during curing, or a monomer that is capable of being polymerized during curing. A resin can be a natural resin, a synthetic resin, or a chemically modified natural resin. A resin can be a thermoplastic material or a thermosetting materials.

The term "cure" as used herein refers to exposing to radiation in any form, heating, or allowing to undergo a physical or chemical reaction that results in hardening or an increase in viscosity. A flowable thermoplastic material can be cured by cooling it such that the material hardens. A flowable thermoset material can be cured by heating or otherwise exposing to irradiation such that the material hardens.

Method of Forming a Porous Abrasive Form.

Various embodiments of the present invention provide a method of forming a porous abrasive form. The method can include heating an abrasive composition including pore inducers. During the heating the pore inducers can reduce in volume to form induced pores in the porous abrasive form. Although during the heating one or more components of the pore inducer may volatilize (e.g., transform to a gas via sublimation or boiling), these one or more components of the pore inducer are no longer in the porous abrasive form and are not to be considered in the determination of volume reduction of the pore inducer in the porous abrasive form. To determine the volume reduction of the pore inducer in the medium, the beginning volume of the pore inducer in the abrasive composition is compared to the final volume of the remaining pore inducer in the porous abrasive form.

The method can include forming the abrasive composition; in some embodiments, the abrasive composition is already formed before the method is performed. Forming the abrasive composition can include combining one or more components of the abrasive composition to form the abrasive composition. The abrasive composition can be a substantially homogeneous composition. Forming the abrasive composition can include adding the pore inducers to the abrasive composition. The pore inducers can be substantially homogeneously distributed in the abrasive composition.

The method can include forming the pore inducers; in some embodiments, the pore inducers are already formed before the method is performed. Forming the pore inducers can include curing a pore inducer starting material to provide the pore inducer. Forming the pore inducers can include placing the pore inducer starting material composition in a mold prior to the curing (e.g., heating, irradiating, light, or a combination thereof). The curing can be performed while the pore inducer starting material composition is in the mold. The method can further include removing the pore inducers from the mold after the curing.

The abrasive composition that is heated can be a pressed abrasive composition. The method can include pressing the abrasive composition before the heating; in some embodiments, the abrasive composition is already pressed before the method begins. The pressing can be any suitable pressing that compresses the abrasive composition, such as pressing in a mold. The pressing can include application of any suitable amount of pressure to the abrasive composition for any suitable time such that the abrasive composition is compressed to a higher density, such as a pressure of about 0.001 $kg/mm^2$ to about 1,000 $kg/mm^2$, about 0.1 $kg/mm^2$ to about 10 $kg/mm^2$, about 0.001 $kg/mm^2$ or less, or about 0.001 $kg/mm^2$ or less, or less than, equal to, or more than about 0.005 $kg/mm^2$, 0.01, 0.05, 0.1, 0.2, 0.4, 0.6, 0.8, 1, 1.2, 1.4, 1.6, 1.8, 2, 2.5, 3, 4, 5, 6, 7, 8, 9, 10, 50, 100, 500, or about 1,000 $kg/mm^2$ or more.

The heating (e.g., "firing") can be any suitable heating, such that the porous abrasive form is generated from the abrasive composition. The heating causes a volume reduction in the pore inducers to form pores. In addition, the heating can cause a physical change or chemical change in one or more other components of the abrasive composition, such as a bonding or binding of various components of the abrasive composition. The heating can cause vitrification of one or more components of the abrasive composition, such that the resulting porous abrasive form is a porous vitrified abrasive form, wherein the vitrification includes formation of "vitrified bonds," "vitreous bonds," "ceramic bonds," "glass bonds" in the porous abrasive form. The heating can cause curing of one or more resinous components of the abrasive composition, such that the porous abrasive form includes a cured resin; if the resin is a major component of the abrasive composition compared to vitrifyable components the heating can form a porous resinoid abrasive form. The heating can include melting or softening of metal components in the abrasive composition. The heating can include heating to a temperature of about 200° C. to about 5000° C., about 700° C. to about 1500° C., about 750° C. to about 1350° C., about 800° C. to about 1000° C., or about 200° C. or less, or less than equal to, or greater than about 250° C., 300, 350, 400, 450, 500, 550, 600, 650, 700, 750, 800, 850, 900, 950, 1,000, 1,100, 1,200, 1,500, 1,750, 2,000, 2,500, 3,000, 3,500, 4,000, or about 5,000° C. or more.

Heating of the abrasive composition can include raising the temperature from room temperature to a maximum temperature over a prolonged period of time (e.g., about 10 hours to about 130 hours) with optional holding at one or more intermediate temperatures (e.g., for about 1 hour to about 20 hours), holding at the maximum temperature (e.g., for about 1 hour to about 20 hours), and then cooling the fired article to room temperature over an extended period of time (e.g., about 10 hours to about 140 hours), with optional holding at one or more intermediate temperatures (e.g., for about 1 hour to about 20 hours). The temperature selected for the heating and the composition of the abrasive composition should be chosen so as to not have a detrimental effect on the physical properties and/or composition of the abrasive particles contained in the abrasive composition or the porous abrasive form.

Abrasive Composition.

Various embodiments of the present invention provide an abrasive composition. The abrasive composition includes pore inducers. Heating of the abrasive composition causes the pore inducers to reduce in volume, thereby generating pores in the formed porous abrasive form.

The abrasive composition can undergo an overall change in volume during the heating such that the volume of the porous abrasive form can be greater than or less than the volume of the abrasive composition. The overall change in volume can be unrelated to the change in volume of the pore inducers, such that a corresponding abrasive composition that is free of the pore inducer undergoes a volume change upon subjecting to heating that is substantially the same as the volume change that occurs when subjecting the abrasive composition including the pore inducers to the same heating conditions. The abrasive composition can have a volume that is about 1% to about 50% greater than the volume of the porous abrasive form, or about 10% to about 25% greater than the volume of the porous abrasive form, or about 0%, or about 1% or less, or less than, equal to, or greater than about 2%, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45%, or about 50% or more.

The abrasive composition can include one type of pore inducer (wherein pore inducers can differ by composition, size, shape, or a combination thereof) or more than one type of pore inducer. The one or more pore inducers can form any suitable weight proportion of the abrasive composition. The one or more pore inducers can be about 0.001 wt % to about 50 wt % of the abrasive composition, about 5 wt % to about 20 wt % of the abrasive composition, or about 0.001 wt % or less, or less than, equal to, or greater than about 0.01 wt %, 0.1, 1, 2, 3, 4, 5, 6, 7, 8, 9, 10, 11, 12, 13, 14, 15, 16, 17, 18, 19, 20, 22, 24, 26, 28, 30, 35, 40, 45, or about 50 wt % or more. The one or more pore inducers can form any suitable volume proportion of the abrasive composition, such as about 0.001 vol % to about 50 vol % of the abrasive composition, about 5 vol % to about 20 vol % of the abrasive composition, or about 0.001 vol % or less, or less than, equal to, or greater than about 0.01 vol %, 0.1, 1, 2, 3, 4, 5, 6, 7, 8, 9, 10, 11, 12, 13, 14, 15, 16, 17, 18, 19, 20, 22, 24, 26, 28, 30, 35, 40, 45, or about 50 vol % or more.

The abrasive composition can include abrasive particles. The abrasive composition can include one type of abrasive particle, or more than one type of abrasive particle. The one or more abrasive particles can form any suitable proportion of the abrasive composition, such as about 1 wt % to about 99 wt % of the abrasive composition, about 50 wt % to about 95 wt %, or about 1 wt % or less, or less than, equal to, or greater than about 2 wt %, 3, 4, 5, 6, 7, 8, 9, 10, 15, 20, 25, 30, 35, 40, 45, 50, 55, 60, 65, 70, 75, 80, 82, 84, 86, 88, 90, 91, 92, 93, 94, 95, 96, 97, 98 wt %, or about 99 wt % or more. The abrasive particles can include a carbide, oxide (e.g., alumina, such as fused alumina), nitride, boride, diamond, ceramic, metal, glass, or a combination thereof. The abrasive particles can be or can include abrasive grains formed of a hard material (e.g., Mohs hardness of at least about 7). The abrasive particles can include abrasive agglomerates, unagglomerated abrasive particles, and combinations thereof. In some embodiments, the abrasive particles can include or be made of inorganic material such as carbides, oxides, nitrides, borides, and combinations thereof. In some embodiments, the abrasive particles can be or include a superabrasive particulate material such as diamond or cubic boron nitride. In some embodiments, the abrasive particles can include or comprise ceramic particles, including, for example, crystallites of alpha alumina, magnesium alumina spinel, and a rare earth hexagonal aluminate prepared using sol-gel precursor alpha alumina particles. Other abrasive particles can include, fused aluminum oxide, treated aluminum oxide, white fused aluminum oxide, ceramic aluminum oxide materials such as those commercially available under the trade designation 3M CERAMIC ABRASIVE GRAIN (from 3M Company of St. Paul, MN), black silicon carbide, green silicon carbide, titanium diboride, boron carbide, tungsten carbide, titanium carbide, garnet, fused alumina zirconia, sol-gel derived abrasive particles, iron oxide, chromia, ceria, zirconia, titania, silicates, tin oxide, silica (such as quartz, glass beads, glass bubbles, and glass fibers), silicates (such as talc, clays (e.g., montmorillonite), feldspar, mica, calcium silicate, calcium metasilicate, sodium aluminosilicate, sodium silicate), flint, emery, and combinations thereof. The abrasive particles can be or can include crushed particulates and/or shaped particles (e.g., ceramic shaped abrasive particles). The abrasive particles can be coated (e.g., coated with a coupling agent), or can be free of coatings.

The abrasive composition can include a binder. The abrasive composition can include one binder, or more than one binder. The binder can bind the abrasive composition together. In some embodiments, the binder can bind the abrasive composition together prior to the heating, but can less or no binding effect in the porous abrasive form (e.g., temporary binder, which can be decomposed or pyrolized during the heating). In some embodiments, the binder can undergo physical change (e.g., melting or softening, following by solidification and hardening) or chemical change (e.g., crosslinking or forming chemical bonds during curing) during the heating such that the binder binds together the porous abrasive form. The one or more binders can form any suitable proportion of the abrasive composition, such as about 1 wt % to about 80 wt % of the abrasive composition, about 5 wt % to about 20 wt %, or about 1 wt % or less, or about 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75 wt %, or about 80 wt % or more of the abrasive composition.

Temporary binders can include dextrins (e.g., potato starch), polysaccharides, polyethylene glycol, polyacrylates, an adhesive, an organic resin (e.g., urea/formaldehyde resin), a wax, or a combination thereof.

Binders that have a binding effect in the porous abrasive form can be any suitable binder. The binder can be a glassy (e.g., vitreous) inorganic material (e.g., for a porous vitrified abrasive form), a metal oxide, a non-metal oxide, a silicate, a mineral, a metal, a curable component (e.g., for a porous resinoid abrasive form), or a combination thereof. The binder can be a vitreous binder (e.g., a glass material such as a glass frit, or a material that forms a glass upon heating), an organic resin, or a combination thereof.

Metal oxide vitreous binders can include silicon oxide, magnesium oxide, calcium oxide, barium oxide, lithium oxide, sodium oxide, potassium oxide, iron oxide, titanium oxide, manganese oxide, zinc oxide, and metal oxides that can be characterized as pigments such as cobalt oxide, chromium oxide, or iron oxide, and combinations thereof.

Non-metal oxides can include boron oxide, phosphorous oxide, and combinations thereof. Suitable examples of non-metal compounds include boric acid.

Silicates can include from aluminum silicates, borosilicates, calcium silicates, magnesium silicates, sodium silicates, lithium silicates, and combinations thereof.

Minerals can include clay, feldspar, kaolin, wollastonite, borax, quartz, soda ash, limestone, dolomite, chalk, and combinations thereof.

The curable component can be any suitable curable component, such as any curable component described herein, such as a shellac, a polyamide, a polyester, a polycarbonate, a polycarbamate, a urethane, a natural resin, an epoxy-based resin, a furan-based resin, a phenolic-based resin, a urea/aldehyde resin, an acrylic, or a combination thereof.

During manufacture of a porous vitrified abrasive form, the vitreous binder, in a powder form, may be mixed with a temporary binder, typically an organic binder. The vitrified binders may also be from a frit, for example anywhere from about 1 to 100 percent frit, but generally 20 to 100 percent frit. A frit can be a composition that has been pre-fired prior to its employment in a vitreous bond precursor composition for forming the vitreous bond phase of a porous vitrified abrasive form. As used herein, a "frit" is a material that is formed by thoroughly blending a mixture comprising one or more frit forming components, followed by heating (also referred to as pre-firing) the mixture to a temperature at least high enough to melt it; cooling the glass, and pulverizing it. Some examples of common materials used in frit binders include feldspar, borax, quartz, soda ash, zinc oxide, whiting, antimony trioxide, titanium dioxide, sodium silicofluoride, flint, cryolite, boric acid, and combinations thereof. These materials can be mixed together as powders, fired to fuse the mixture, and then the fused mixture can be cooled. The cooled mixture can be crushed and screened to a very fine powder and then used as a first binder.

The abrasive composition can include any other suitable components, such as a secondary pore inducer, a solvent (e.g., water, organic solvent, oil, or a combination thereof), a lubricant, a processing aid, a filler, a colorant (e.g., dye or pigment), an adhesive, or a combination thereof.

Pore Inducers and Pores Formed Therefrom.

In various embodiments, the present invention provides a pore inducer. The pore inducer can be any suitable pore inducer that can be used to perform an embodiment of the method described herein. Upon heating within a medium, such as within an abrasive composition, the pore inducer in the medium reduces in volume to form an induced pore in the medium. Although during the heating one or more components of the pore inducer may volatilize (e.g., transform to a gas via sublimation or boiling), these one or more components of the pore inducer are no longer in the medium and are not to be considered in the determination of volume reduction of the pore inducer in the medium. To determine the volume reduction of the pore inducer in the medium, the beginning volume of the pore inducer in the medium is compared to the final volume of the remaining pore inducer in the medium.

The induced pores in the porous abrasive form are aspects of the extrinsic porosity of the porous abrasive form. In contrast, the intrinsic porosity of the porous abrasive form can be independent of the extrinsic porosity, and can include pores caused by natural packing inefficiencies of various components of the porous abrasive form, glass bond degassing during firing, or other events natural to formation of the porous abrasive form. In various embodiments, intrinsic porosity can be manipulated in the porous abrasive form, such as by modulating aspect ratios of abrasive particles in the abrasive composition.

The induced pores in the porous abrasive form can substantially correspond in shape and location to that of the pore inducers in the abrasive composition prior to the heating. The induced pores can approximately correspond in size to that of the pore inducers in the abrasive composition prior to the heating. Each induced pore can independently have a volume that is about 50% to about 100% of the volume of the pore inducer in the abrasive composition prior to the heating that corresponds to the induced pore, or about 70% to about 95%, or about 50% or less, or less than, equal to, or more than about 55%, 60, 65, 70, 72, 74, 76, 78, 80, 82, 84, 86, 88, 90, 91, 92, 93, 94, 95, 96, 97, 98, 99%, or about 100%.

The present invention is not limited to any particular mechanism of volume reduction of the pore inducer during the heating of the abrasive composition to form the porous abrasive form. In some embodiments, during the heating one or more components of the pore inducers can melt or become flowable, such as a hollow component. When a hollow component melts or becomes flowable, the component can transform from a hollow shell that includes open space to a non-hollow shape or distribution that has significantly reduced volume. In some embodiments, during the heating, one or more components of the pore inducers vaporize, sublime, decompose, pyrolize, or a combination thereof.

The pore inducers can have random shapes. The pore inducers can be shaped pore inducers, such that the pore inducers are three dimensional geometric shapes, such as the same shape or different shapes, such as tetrahedrons, square pyramids, hexagonal pyramids, cubes, cuboids, triangular prisms, octahedrons, pentagonal prisms, hexagonal prisms, dodecahedrons, spheres, ellipsoids, icosahedron, cones, cylinders, sections of any one thereof, or any combination thereof.

The pore inducers can have any suitable size. The pore inducers can be equally sized, or the pore inducers can include more than one size. The pore inducers can have a particle size (e.g., largest dimension) of about 0.1 micron to about 10,000 microns, or about 200 microns to about 1,500 microns, or about 0.1 microns or less, or less than or equal to, or greater than about 1 micron, 2, 4, 6, 10, 15, 20, 25, 50, 100, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,600, 1,700, 1,800, 1,900, 2,000, 2,250, 2,500, 2,750, 3,000, 3,500, 4,000, 4,500, 5,000, 6,000, 7,000, 8,000, 9,000, or about 10,000 microns or more.

The pore inducer can include a hollow glass filler. The hollow glass filler can have any suitable shape such that a hollow space occurs within the hollow glass filler particle. The hollow space can be closed (e.g., substantially sealed from the external environment) or open (e.g., not completely sealed from the environment, but still includes a hollow area and is sufficient to exclude surrounding materials from the hollow area). When a hollow glass filler melts or becomes flowable, the hollow glass filler can transform from a hollow shell that includes open space to a non-hollow shape or distribution that has significantly reduced volume. The hollow glass filler can be a glass bubble, or a glass sphere. The hollow glass filler can include any suitable type of glass, such as soda-lime glass, fused silica glass, borosilicate glass, lead-oxide glass, aluminosilicate glass, oxide glass, glass with high zirconia content, or a combination thereof. The hollow glass filler can include borosilicate glass. A pore inducer can include one type of hollow glass filler or more than one type of hollow glass filler. The one or more hollow glass fillers can form any suitable proportion of the pore inducer, such as about 0.001 wt % to about 100 wt % of the pore inducer, about 1 wt % to about 30 wt %, or about 0.001 wt % or less, or less than, equal to, or greater than about 0.01 wt %, 0.1, 1, 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 96, 97, 98, 99 wt % or more, or about 100 wt %. the hollow glass fillers can have any suitable particle size (e.g., largest dimension), such as about 0.1 micron to about 1,000 microns, about 50 microns to about 100 microns, about 0.1 microns or less, or less than, equal to, or greater than about 1, 2, 3, 4, 5, 6, 8, 10, 15, 20, 25, 30, 35, 40, 45, 50, 55, 60, 65, 70, 75, 80, 85, 90, 95, 100, 105, 110, 115, 120, 125, 130, 135, 140, 145, 150, 160, 170, 180, 190, 200, 225, 250, 275, 300, 350, 400, 500, 600, 800, or about 1,000 microns or more.

The pore inducer can include a cured component. The cured component can be any suitable cured material. The cured component can be a cured resin, a cured latex, or a combination thereof. Pore inducer can include one cured component or more than one cured component. The one of more cured components can form any suitable proportion of the pore inducer, such as about 1 wt % to about 99 wt % of the pore inducer, about 70 wt % to about 90 wt % of the pore inducer, or about 1 wt % or less, or less than, equal to, or greater than about 2 wt %, 3, 4, 5, 6, 8, 10, 15, 20, 25, 30, 35, 40, 45, 50, 55, 60, 62, 64, 66, 68, 70, 72, 74, 76, 78, 80, 82, 84, 86, 88, 90, 92, 94, 95, 96, 97, 98, 99 wt %, or about 100 wt %. The cured component of the pore inducer can be a cured product of a shellac, a polyamide, a polyester, a polycarbonate, a polycarbamate, a urethane, a natural resin, an epoxy-based resin, a furan-based resin, a phenolic-based resin, a urea/aldehyde resin, an acrylic, or a combination thereof. The cured component of the pore inducer can be a cured product of bisphenol A diglycidyl ether resin, butoxymethyl butyl glycidyl ether resin, bisphenol A-epichlorohydrin resin, bisphenol F resin, or a combination thereof. The cured component of the pore inducer can be a cured product of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly (methyl methacrylate), poly(butyl methacrylate), poly(2-ethylhexyl methacrylate), an acrylamidomethylpropane sulfonate polymer or copolymer or derivative thereof, an acrylic acid/acrylamidomethylpropane sulfonate copolymer, or a combination thereof. The cured component of the pore inducer can be a cured product of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, or a combination thereof. The cured component of the pore inducer can be a cured product of at least one of an acrylate ester and an acrylic resin. The cured component of the pore inducer can be a cured product of trimethylolpropane triacrylate, an acrylic resin, or a combination thereof.

The pore inducer can include a plant material, such as one type of plant material or more than one type of plant material. The one or more plant materials can form any suitable proportion of the pore inducer, such as about 0.001 wt % to about 100 wt % of the pore inducer, about 1 wt % to about 30 wt %, or about 0.001 wt % or less, or less than, equal to, or greater than about 0.01 wt %, 0.1, 1, 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 96, 97, 98, 99 wt % or more, or about 100 wt %. The plant material can be a product from a shell, a seed, wood, or a combination thereof. The plant material can be walnut shells, walnut shell flour, coconut shells, coconut shell flour, or a combination thereof.

The pore inducer can include a heat-volatile, heat-decomposable, or heat-pyrolizable component, such as one such component or more than one such component. The one or more heat-volatile, heat-decomposable, or heat-pyrolizable components can form any suitable proportion of the pore inducer, such as about 0.001 wt % to about 100 wt % of the pore inducer, about 1 wt % to about 30 wt %, or about 0.001 wt % or less, or less than, equal to, or greater than about 0.01 wt %, 0.1, 1, 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 96, 97, 98, 99 wt % or more, or about 100 wt %. The heat-volatile, heat-decomposable, or heat-pyrolizable component can be a gel, naphthalene, a gamma-pyrone (e.g., ethyl maltol, methyl maltol, and the like), urea, a polyethylene, a polypropylene, a polyethylene glycol, a dextrin, a polysaccharide, a polyacrylate, an adhesive, a resin, or a combination thereof. The heat-volatile, heat-decomposable, or heat-pyrolizable material can be ethyl maltol.

Porous Abrasive Form.

In various embodiments the present invention provides a porous abrasive form. The porous abrasive form can be any suitable porous abrasive form that can be made using an embodiment of the method of forming a porous abrasive form described herein. The porous abrasive form can include pore inducers that have reduced in volume to form induced pores in the porous abrasive form. In the porous abrasive form, residual material from the volume-reduced pore inducers can be present on or adjacent to the inner surface of the pores therein. The residual material can include material in the pore inducer that melted, pyrolized, or degraded during the heating to form the porous abrasive form, and can be substantially free of material from the pore inducer that sublimed or vaporized during the heating.

The porous abrasive form can be any suitable form suitable for grinding or abrasion of a substrate. For example, the porous abrasive form can be an abrasive grinding wheel, a cut-off wheel, a hone, a whet stone, or a combination thereof. In some embodiments, the porous abrasive form can be a porous vitrified abrasive form. In some embodiments, the porous abrasive form can be a porous resinoid abrasive form, or another type of porous abrasive form.

The induced pores, other pores, or the combination thereof, can form any suitable volume proportion of the porous abrasive form, such as about 0.001 vol % to about 50 vol % of the porous abrasive form, about 5 vol % to about 20 vol % of the porous abrasive form, or about 0.001 vol % or less, or less than, equal to, or greater than about 0.01 vol %, 0.1, 1, 2, 3, 4, 5, 6, 7, 8, 9, 10, 11, 12, 13, 14, 15, 16, 17, 18, 19, 20, 22, 24, 26, 28, 30, 35, 40, 45, or about 50 vol % or more.

The porous abrasive form can have any suitable density, such as about 1.3 g/cm$^3$ to about 2.7 g/cm$^3$, about 1.7 g/cm$^3$ to about 2.0 g/cm$^3$, or about 1.3 g/cm$^3$ or less, or less than, equal to, or greater than about 1.4 g/cm$^3$, 1.5, 1.55, 1.6, 1.65, 1.7, 1.75, 1.8, 1.85, 1.9, 1.95, 2, 2.1, 2.2, 2.3, 2.4, 2.5, 2.6, or about 2.7 g/cm$^3$ or more.

EXAMPLES

Various embodiments of the present invention can be better understood by reference to the following Examples which are offered by way of illustration. The present invention is not limited to the Examples given herein.

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Missouri, or may be synthesized by known methods.

Abbreviations and descriptions of materials used in the Examples are listed in Table 1.

TABLE 1

| | |
|---|---|
| TMPTA | Trimethylolpropane triacrylate, obtained under trade designation "SARTOMER 351" from Sartomer Americas, Exton, Pennsylvania. |
| PI | α-Amino ketone photoinitiator, obtained under trade designation "IRGACURE 369" from BASF, Florham Park, New Jersey. |
| AC1 | Acrylic polymer, obtained under trade designation "ARKEMA ENCOR 651" from Arkema Coating Resins, Cary, North Carolina. |
| AC2 | Acrylic polymer, obtained under trade designation "ARKEMA ENCOR 357" from Arkema Coating Resins, Cary, North Carolina. |
| AC3 | Acrylic polymer, obtained under trade designation "ARKEMA ENCOR 626" from Arkema Coating Resins, Cary, North Carolina. |
| AC4 | Acrylic polymer, obtained under trade designation "ARKEMA ENCOR DT 211" from Arkema Coating Resins, Cary, North Carolina. |
| AC5 | Acrylic polymer, obtained under trade designation "NEOCAR ACRYLIC 820" from Arkema Coating Resins, Cary, North Carolina. |
| GB | Glass bubbles, 70 μm, obtained under trade designation "Q-CELL 6028" from Potters Industries, Valley Forge, Pennsylvania. |
| EM | Ethyl maltol (C.A.S. #4940-11-8), obtained from Sigma-Aldrich, St. Louis, Missouri. |
| WS | Walnut shell flour, #200 mesh, obtained as WF-5 from Composition Materials Company, Inc., Milford, Connecticut. |
| PO | Peanut oil, 2% in methanol. Peanut oil available from Archer Daniels Midland Company, Chicago, Illinois. |
| PT1 | Polypropylene tool having a rectangular array of 333 mold cavities per square inch (52 mold cavities per square cm) of top dimensions 0.0295 inches × 0.0295 inches (0.75 millimeters (mm) × 0.75 mm), tapering inward at a 18 degree angle on all sides, to a depth of 0.0300 inches (0.76 mm) (alternatively- tapering to a bottom dimension of 0.0200 inches × 0.0200 inches (0.51 mm × 0.51 mm) at a depth of 0.0300 inches (0.76 mm). |
| PT2 | Polypropylene tool having a rectangular array of 333 mold cavities per square inch (52 mold cavities per square cm) of top dimensions 0.0295 inches × 0.0295 inches (0.75 mm × 0.75 mm), tapering to a bottom dimension of 0.0200 inches × 0.0200 inches (0.51 mm × 0.51 mm) at a depth of 0.0300 inches (0.76 mm). |
| AP1 | White fused alumina abrasive particles, obtained under trade designation "DURALUM SPECIAL WHITE F54" from Washington Mills Electro Minerals, Niagara Falls, New York. |
| AP2 | White fused alumina abrasive particles, obtained under trade designation "DURALUM SPECIAL WHITE F60" from Washington Mills Electro Minerals, Niagara Falls, New York. |
| AP3 | White fused alumina abrasive particles, obtained under trade designation "DURALUM SPECIAL WHITE F70" from Washington Mills Electro Minerals, Niagara Falls, New York. |
| AP4 | White fused alumina abrasive particles, obtained under trade designation "DURALUM SPECIAL WHITE F320" from Washington Mills Electro Minerals, Niagara Falls, New York. |
| V601 | A glass frit blend. |
| V904 | A glass frit blend. |
| NAP | Naphthalene, CAS #91-20-3, available from Sigma-Aldrich, St. Louis, Missouri. |
| UFR | A urea-formaldehyde resin, obtained under the trade designation "DURITE 3029c" from Momentive Specialty Chemicals, Inc., Columbus, Ohio. |
| TB1 | Temporary binder, dextrin, obtained from Agrana Starke GmbH, Austria. |
| TB2 | A temporary binder resin that includes a UFR and optionally a wax component. |

Example 1. Shaped Pore Inducer

Figure 1A:
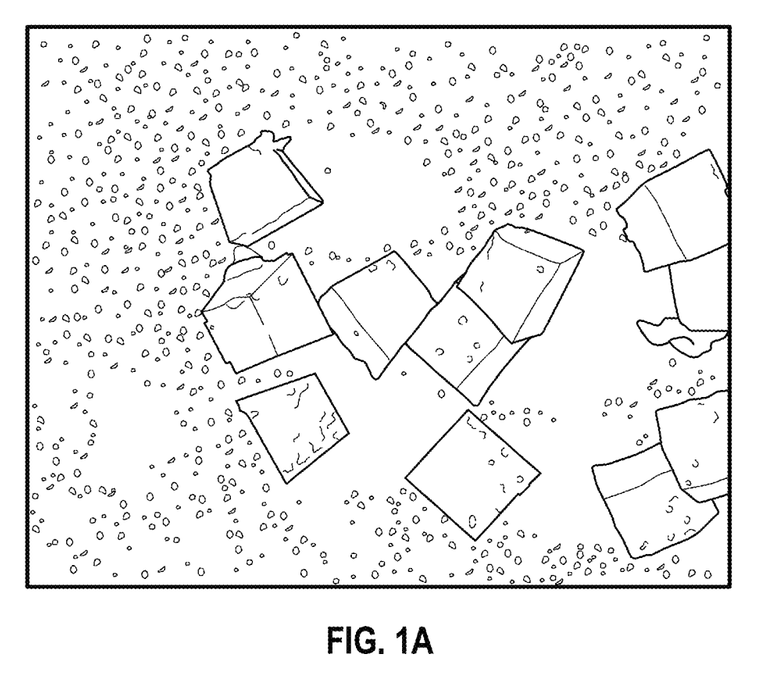
FIGS. 1A-B illustrate images of shaped pore inducers at various magnifications, in accordance with various embodiments.
Figure 1B:
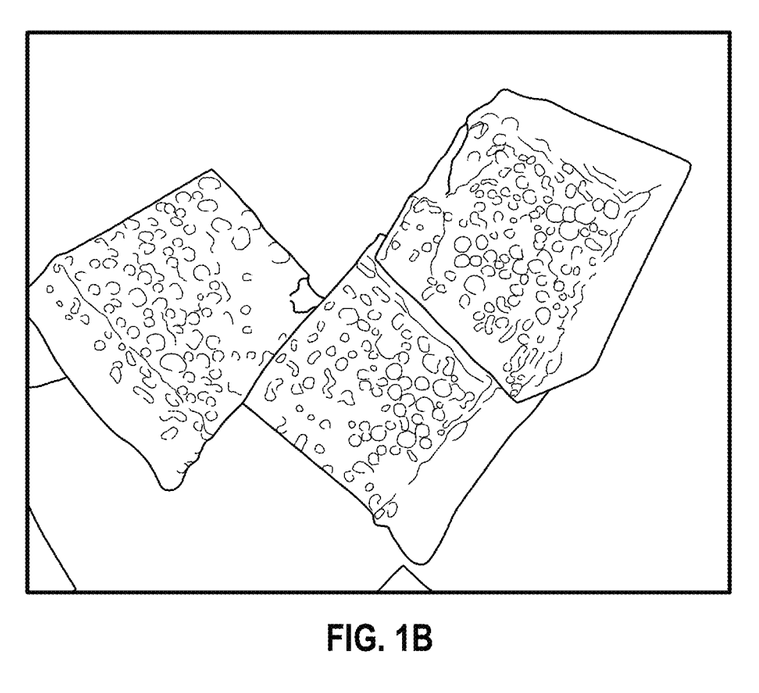

A mixture of 99% by weight TMPTA and 1% PI (10 grams) was combined with 2 grams of GB and thoroughly mixed with a spatula. PT1 was coated with PO and allowed to air dry. The TMPTA/PI/GB mixture (fill composition) was spread into the tooling cavities with a spatula. The filled tool was then placed (filled side up) on an aluminum support plate, a layer of polyethylene release film (obtained from Loparex Inc., Cary, North Carolina) was applied to the top of the filled tool cavities, and a quartz panel was placed on the release film. The assembly was exposed to a UV light source used to cure the TMPTA. The tool containing the cured composition was then passed under an ultrasonic horn to dislodge the cured, shaped pore inducer. Photomicrographs of the shaped pore inducer are shown in FIGS. 1A-B. FIG. 1A shows the shaped pore inducers at 20× magnification. FIG. 1B shows the shaped pore inducers at 50× magnification. The shaped pore inducers had a maximum dimension of 720 microns.

Example 2. Shaped Pore Inducer

Example 2 was performed identically to Example 1 with the exception that the fill composition included 12 grams of the TMPTA/PI mixture, 2 grams of GB, and 2 grams of EM.

Example 3. Shaped Pore Inducer

Example 3 was prepared identically to Example 1 with the exceptions that: 1) the thermally-curable fill composition included 10 grams of AC3 and 2 grams of GB was substituted for the UV-curable fill composition; and 2) the filled tool was cured at 100 degrees F. (38 degrees C.) for 2 hours (no UV cure).

Example 4. Comparative. NAP Pore Inducer

A NAP pore inducer was provided, which was random-shaped and having a size around 700 to 1400 microns.

Example 5. Vitrified Test Bars

Vitrified test bars were made with Comparative Example 4 NAP pore inducers using the following procedure: A composition of 18.35 grams AP1, 45.87 grams AP2, 27.52 grams AP3, 8.26 grams V601, 0.95 grams TB1, 3.55 grams TB2, and 10 grams NAP was thoroughly mixed. One-half (56 grams) of the mixture was placed into and leveled with the top of a steel bar mold of rectangular cavity dimensions 120 mm×12 mm×50 mm height, wherein a bottom punch extended into the bottom of the mold at the time of filling about 13-15 mm. The mold was closed by inserting a top punch and pressed under a load of 3000 pounds (1361 kilograms. The bar was removed from the mold and the procedure repeated to produce a second bar. Each bar was then placed on loose AP4 and put into an oven for firing according to the schedule as shown in Table 2.

TABLE 2

| Temperature, ° C. | Rate, ° C./minute |
| --- | --- |
| room temperature to 420 | +2 |
| 420 for 4 hours | 0 |
| 420-700 | +2 |
| 700 for 4 hours | 0 |
| 700-900 | +2 |
| 900 for 4 hours | 0 |
| 900 to room temperature | −5 |

Figure 2A:
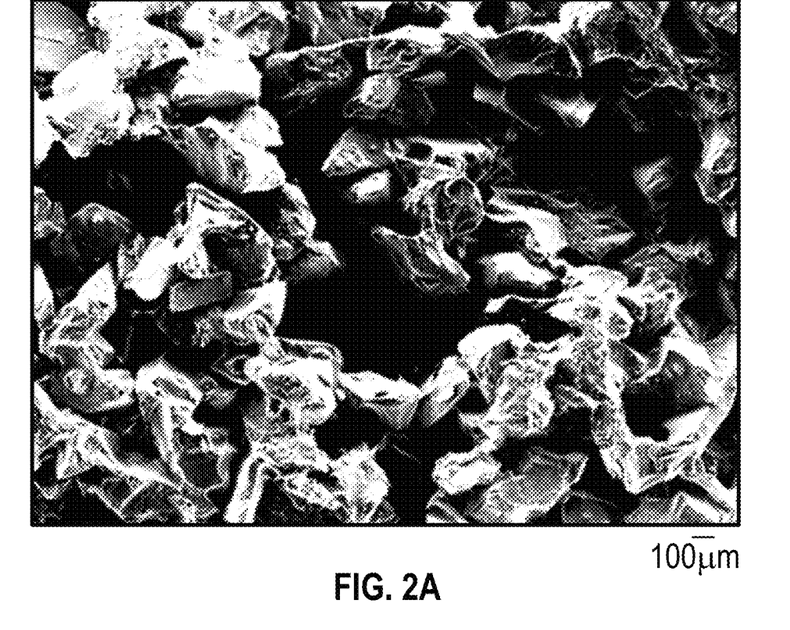
FIGS. 2A-B illustrate scanning electron microscope (SEM) images of pores formed by naphthalene pore inducers.
Figure 2B:
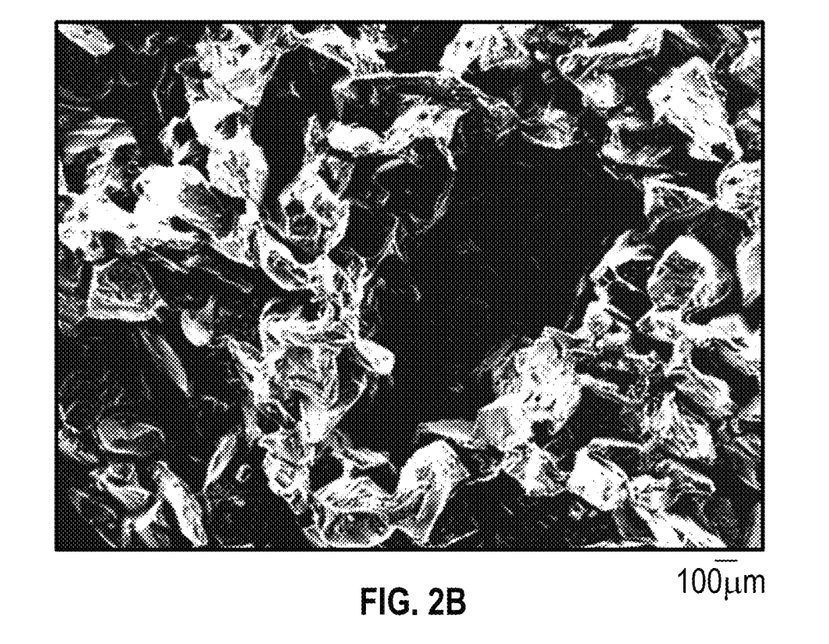

Scanning electron microscope (SEM) micrographs of the resulting pores in vitrified test bars are shown in FIGS. 2A-B. The vitrified test bar had a density of 1.77 g/cm$^3$.

Figure 3A:
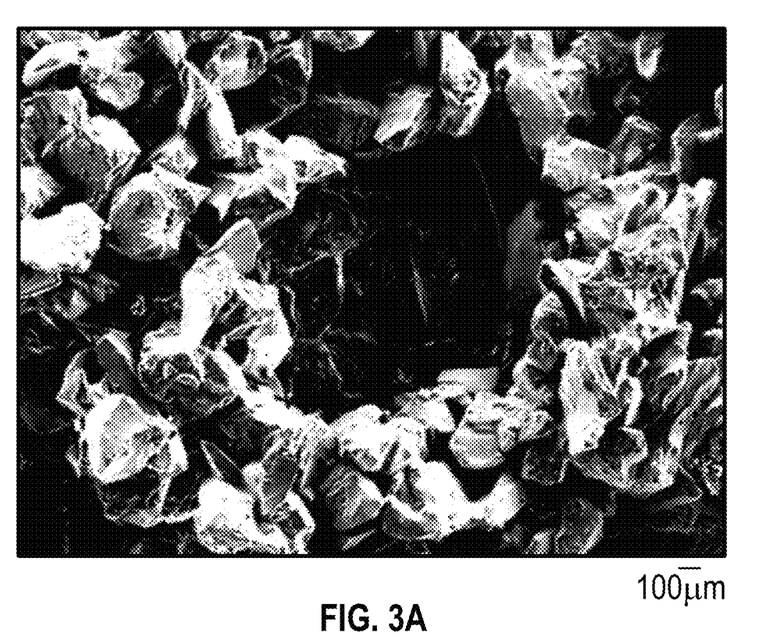
FIGS. 3A-C illustrate SEM micrographs pores in vitrified test bars resulting from shaped pore inducers, in accordance with various embodiments.
Figure 3B:
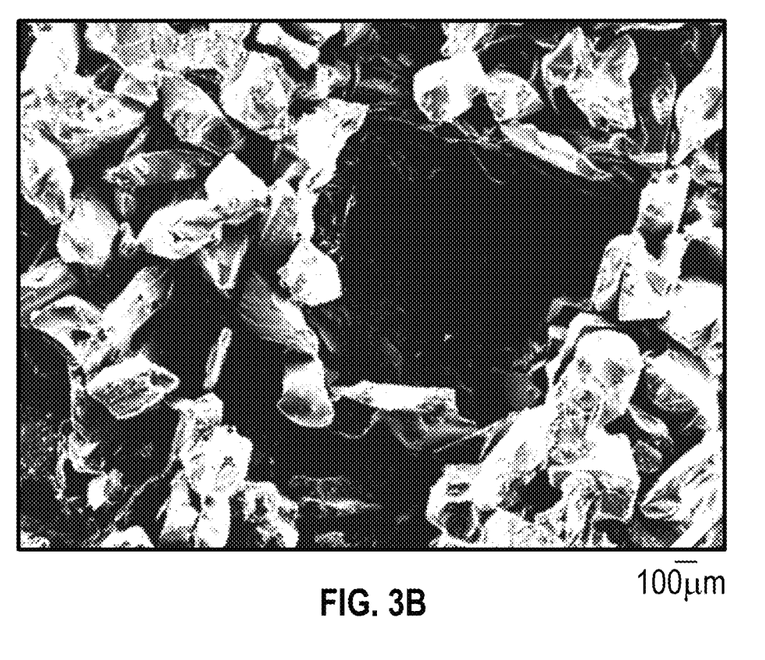
Figure 3C:
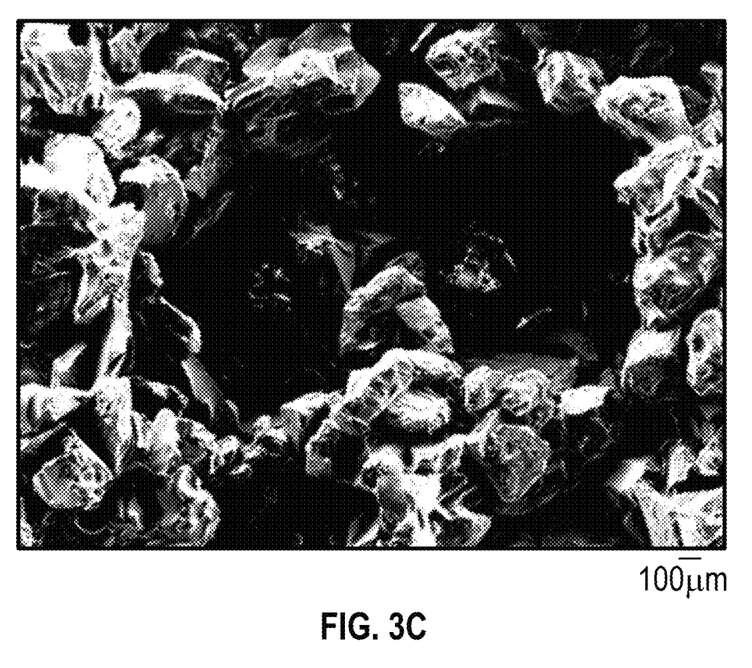
Figure 4A:
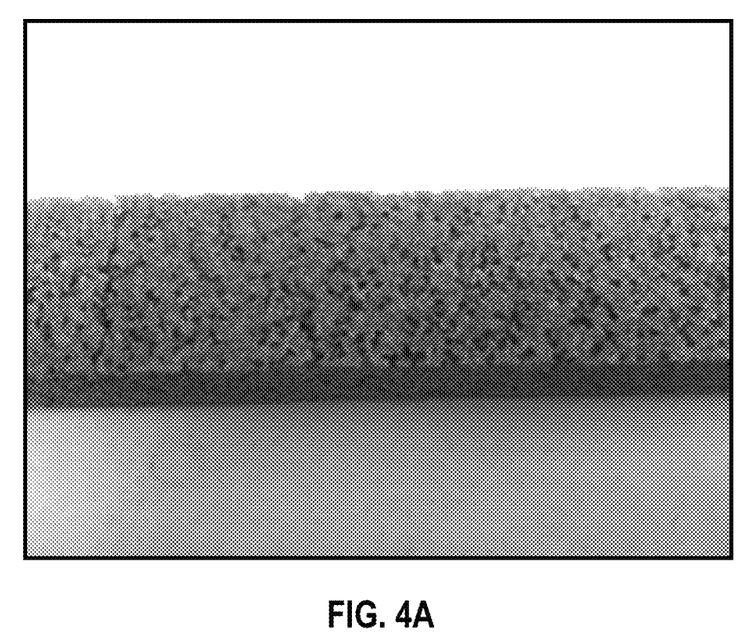
FIGS. 4A-B illustrate photomicrographs of the vitrified test bar formed using shaped pore inducers, in accordance with various embodiments.
Figure 4B:
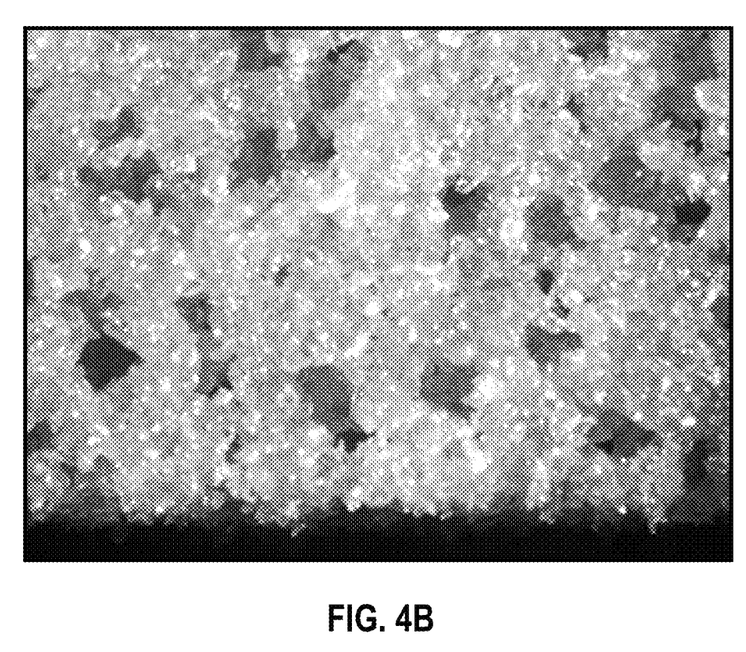

Vitrified test bars were made following the same procedure except that 10 grams of the shaped pore inducer of Example 1 was used instead of the NAP pore inducers. The resulting vitrified bars had uniformly shaped pores distributed evenly throughout the bar. SEM micrographs of the resulting pores in the vitrified test bar are shown in FIGS. 3A-C. FIGS. 4A-B illustrate photomicrographs of the vitrified test bar, with FIG. 4A at 2× magnification, and with FIG. 4B at 20× magnification. The physical properties of the vitrified test bar are shown in Table 3.

TABLE 3

Physical properties of vitrified test bar.

| | Before firing | After firing |
| --- | --- | --- |
| Weight | 56.0 g | 49.5 g |
| Height | 18.25 mm | 18.25 mm |
| Thickness | 12 mm | 12 mm |
| Length | 120 mm | 120 mm |
| Density | 2.131 g/mm3 | 1.884 g/cm3 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of forming a porous abrasive form, the method comprising:

heating an abrasive composition comprising pore inducers, to form the porous abrasive form, wherein during the heating the pore inducers in the porous abrasive form reduce in volume to form induced pores in the porous abrasive form.

Embodiment 2 provides the method of Embodiment 1, wherein the porous abrasive form is an abrasive grinding wheel, a cut-off wheel, a hone, a whet stone, or a combination thereof.

Embodiment 3 provides the method of any one of Embodiments 1-2, further comprising forming the abrasive composition.

Embodiment 4 provides the method of any one of Embodiments 1-3, further comprising forming the pore inducers.

Embodiment 5 provides the method of Embodiment 4, wherein forming the pore inducers comprises curing a pore inducer starting material composition, to provide the pore inducers.

Embodiment 6 provides the method of Embodiment 5, wherein forming the pore inducers further comprises placing the pore inducer starting material composition in a mold prior to the curing, wherein the curing is performed while the pore inducer starting material composition is in the mold, further comprising removing the pore inducers from the mold after the curing.

Embodiment 7 provides the method of any one of Embodiments 1-6, wherein the abrasive composition is a pressed abrasive composition.

Embodiment 8 provides the method of any one of Embodiments 1-7 further comprising pressing the abrasive composition prior to the heating.

Embodiment 9 provides the method of Embodiment 8, wherein the pressing comprises a pressure of about 0.001 kg/mm$^2$ to about 1,000 kg/mm$^2$.

Embodiment 10 provides the method of any one of Embodiments 8-9, wherein the pressing comprises a pressure of about 0.1 kg/mm$^2$ to about 10 kg/mm$^2$.

Embodiment 11 provides the method of any one of Embodiments 1-10, wherein the induced pores substantially correspond in shape and location to that of the pore inducers in the abrasive composition prior to the heating.

Embodiment 12 provides the method of any one of Embodiments 1-11, wherein the induced pores approximately correspond in size to that of the pore inducers in the abrasive composition prior to the heating.

Embodiment 13 provides the method of Embodiment 12, wherein the induced pores have a volume that is about 50% to about 100% of the volume of the pore inducers in the abrasive composition prior to the heating.

Embodiment 14 provides the method of any one of Embodiments 12-13, wherein the induced pores have a volume that is about 70% to about 95% of the volume of the pore inducers in the abrasive composition prior to the heating.

Embodiment 15 provides the method of any one of Embodiments 1-14, wherein during the heating one or more components of the pore inducers melt or become flowable.

Embodiment 16 provides the method of any one of Embodiments 1-15, wherein during the heating one or more components of the pore inducers vaporize, sublime, decompose, pyrolize, or a combination thereof.

Embodiment 17 provides the method of any one of Embodiments 1-16, wherein the abrasive composition undergoes volume contraction during the heating to form the porous abrasive form.

Embodiment 18 provides the method of Embodiment 17, wherein the abrasive composition has a volume that is about 1% to about 50% greater than the volume of the porous abrasive form.

Embodiment 19 provides the method of any one of Embodiments 17-18, wherein the abrasive composition has a volume that is about 10% to about 25% greater than the volume of the porous abrasive form.

Embodiment 20 provides the method of any one of Embodiments 1-19, wherein the heating comprising vitrifying, wherein the porous abrasive form comprises a porous vitrified abrasive form.

Embodiment 21 provides the method of any one of Embodiments 1-20, wherein the heating comprises a temperature of about 200° C. to about 5000° C.

Embodiment 22 provides the method of any one of Embodiments 1-21, wherein the heating comprises a temperature of about 800° C. to about 1000° C.

Embodiment 23 provides the method of any one of Embodiments 1-22, wherein the pore inducers are about 0.001 wt % to about 50 wt % of the abrasive composition.

Embodiment 24 provides the method of any one of Embodiments 1-23, wherein the pore inducers are about 5 wt % to about 20 wt % of the abrasive composition.

Embodiment 25 provides the method of any one of Embodiments 1-24, wherein the pore inducers are shaped pore inducers.

Embodiment 26 provides the method of any one of Embodiments 1-25, wherein the pore inducers are three dimensional geometric shapes.

Embodiment 27 provides the method of any one of Embodiments 1-26, wherein the pore inducers are tetrahedrons, square pyramids, hexagonal pyramids, cubes, cuboids, triangular prisms, octahedrons, pentagonal prisms, hexagonal prisms, dodecahedrons, spheres, ellipsoids, icosahedron, cones, cylinders, sections of any one thereof, or any combination thereof.

Embodiment 28 provides the method of any one of Embodiments 1-27, wherein the pore inducers have a particle size of about 0.1 micron to about 10,000 microns.

Embodiment 29 provides the method of any one of Embodiments 1-28, wherein the pore inducers have a particle size of about 200 microns to about 1,500 microns.

Embodiment 30 provides the method of any one of Embodiments 1-29, wherein the pore inducer comprises a hollow glass filler.

Embodiment 31 provides the method of Embodiment 30, wherein the hollow glass filler is about 0.001 wt % to about 100 wt % of the pore inducer.

Embodiment 32 provides the method of any one of Embodiments 30-31, wherein the hollow glass filler is about 1 wt % to about 30 wt % of the pore inducer.

Embodiment 33 provides the method of any one of Embodiments 30-32, wherein the hollow glass filler is a hollow glass sphere.

Embodiment 34 provides the method of any one of Embodiments 30-33, wherein the hollow glass filler has a particle size of about 0.1 micron to about 1,000 microns Embodiment 35 provides the method of any one of Embodiments 30-34, wherein the hollow glass filler has a particle size of about 50 microns to about 100 microns.

Embodiment 36 provides the method of any one of Embodiments 30-35, wherein the hollow glass filler comprises soda-lime glass, fused silica glass, borosilicate glass, lead-oxide glass, aluminosilicate glass, oxide glass, glass with high zirconia content, or a combination thereof.

Embodiment 37 provides the method of any one of Embodiments 30-36, wherein the hollow glass filler comprises borosilicate glass.

Embodiment 38 provides the method of any one of Embodiments 1-37, wherein the pore inducer comprises a cured component.

Embodiment 39 provides the method of Embodiment 38, wherein the cured component of the pore inducer is a cured resin, a cured latex, or a combination thereof.

Embodiment 40 provides the method of any one of Embodiments 1-39, wherein the cured component of the pore inducer is about 1 wt % to about 99 wt % of the pore inducer.

Embodiment 41 provides the method of any one of Embodiments 1-40, wherein the cured component of the pore inducer is about 70 wt % to about 90 wt % of the pore inducer.

Embodiment 42 provides the method of any one of Embodiments 38-41, wherein the cured component of the pore inducer is a cured product of a shellac, a polyamide, a polyester, a polycarbonate, a polycarbamate, a urethane, a natural resin, an epoxy-based resin, a furan-based resin, a phenolic-based resin, a urea/aldehyde resin, an acrylic, or a combination thereof.

Embodiment 43 provides the method of any one of Embodiments 38-42, wherein the cured component of the pore inducer is a cured product of at least one of an acrylate ester and an acrylic resin.

Embodiment 44 provides the method of any one of Embodiments 38-43, wherein the cured component of the pore inducer is a cured product of trimethylolpropane triacrylate, an acrylic resin, or a combination thereof.

Embodiment 45 provides the method of any one of Embodiments 1-44, wherein the pore inducer comprises a plant material.

Embodiment 46 provides the method of Embodiment 45, wherein the plant material is about 0.001 wt % to about 100 wt % of the pore inducer.

Embodiment 47 provides the method of any one of Embodiments 45-46, wherein the plant material is about 1 wt % to about 30 wt % of the pore inducer.

Embodiment 48 provides the method of any one of Embodiments 45-47, wherein the plant material comprises a product from a shell, a seed, wood, or a combination thereof.

Embodiment 49 provides the method of any one of Embodiments 45-48, wherein the plant material comprises walnut shells, walnut shell flour, coconut shells, coconut shell flour, or a combination thereof.

Embodiment 50 provides the method of any one of Embodiments 1-49, wherein the pore inducer comprises a heat-volatile, heat-decomposable, or heat-pyrolizable component.

Embodiment 51 provides the method of Embodiment 50, wherein the heat-volatile, heat-decomposable, or heat-pyrolizable component is about 0.001 wt % to about 100 wt % of the pore inducer.

Embodiment 52 provides the method of any one of Embodiments 50-51, wherein the heat-volatile, heat-decomposable, or heat-pyrolizable component is about 1 wt % to about 30 wt % of the pore inducer.

Embodiment 53 provides the method of any one of Embodiments 50-52, wherein the heat-volatile, heat-decomposable, or heat-pyrolizable component is a gel, naphthalene, a gamma-pyrone, urea, a polyethylene, a polypropylene, a polyethylene glycol, a dextrin, a polysaccharide, a polyacrylate, an adhesive, a resin, or a combination thereof.

Embodiment 54 provides the method of any one of Embodiments 50-53, wherein the heat-volatile, heat-decomposable, or heat-pyrolizable material is ethyl maltol.

Embodiment 55 provides the method of any one of Embodiments 1-54, wherein the abrasive composition further comprises abrasive particles.

Embodiment 56 provides the method of Embodiment 55, wherein the abrasive particles are about 1 wt % to about 99 wt % of the abrasive composition.

Embodiment 57 provides the method of any one of Embodiments 55-56, wherein the abrasive particles are about 50 wt % to about 95 wt % of the abrasive composition.

Embodiment 58 provides the method of any one of Embodiments 55-57, wherein the abrasive particles comprise a carbide, oxide, nitride, boride, diamond, ceramic, metal, glass, or a combination thereof.

Embodiment 59 provides the method of any one of Embodiments 55-58, wherein the abrasive particles comprises fused alumina.

Embodiment 60 provides the method of any one of Embodiments 1-59, wherein the abrasive composition further comprises a binder.

Embodiment 61 provides the method of Embodiment 60, wherein the binder is about 1 wt % to about 80 wt % of the abrasive composition.

Embodiment 62 provides the method of any one of Embodiments 60-61, wherein the binder is about 5 wt % to about 20 wt % of the abrasive composition.

Embodiment 63 provides the method of any one of Embodiments 60-62, wherein the binder is a glassy inorganic material, a metal oxide, a non-metal oxide, a silicate, a mineral, a metal, a curable component, or a combination thereof.

Embodiment 64 provides the method of any one of Embodiments 60-63, wherein the binder is a vitreous binder, an organic resin, or a combination thereof.

Embodiment 65 provides the method of any one of Embodiments 1-64, wherein the abrasive composition, further comprises a secondary pore inducer.

Embodiment 66 provides the method of any one of Embodiments 1-65, wherein the porous abrasive form has a density of about 1.3 $g/cm^3$ to about 2.7 $g/cm^3$.

Embodiment 67 provides the method of any one of Embodiments 1-66, wherein the porous abrasive form has a density of about 1.7 $g/cm^3$ to about 2.0 $g/cm^3$.

Embodiment 68 provides a porous vitrified abrasive form made by the method of any one of Embodiments 1-67.

Embodiment 69 provides a method of forming a porous vitreous abrasive form, the method comprising:

heating an abrasive composition comprising pore inducers comprising hollow glass filler, to form the porous vitreous abrasive form, wherein during the heating the pore inducers in the porous vitreous abrasive form reduce in volume to form induced pores in the porous vitreous abrasive form.

Embodiment 70 provides a porous abrasive form comprising:

pore inducers that have reduced in volume to form induced pores in the porous abrasive form.

Embodiment 71 provides a pore inducer, wherein upon heating within a medium the pore inducer in the medium reduces in volume to form an induced pore in the medium Embodiment 72 provides the method, porous abrasive form, or pore inducer of any one or any combination of Embodiments 1-71 optionally configured such that all elements or options recited are available to use or select from.

What is claimed is:

1. A method of forming a porous abrasive form, the method comprising:

heating an abrasive composition to form the porous abrasive form, the abrasive composition comprising a plurality of pore inducers, the plurality of pore inducers having a pore inducer composition that comprises gamma-pyrone, the plurality of pore inducers each having a 3D geometric shape and a size, wherein the plurality of pore inducers have the same 3D geometric shape and size; and wherein during the heating the pore inducers in the porous abrasive form reduce in volume to form induced pores in the porous abrasive form, wherein the induced pores substantially correspond in shape and location to that of the pore inducers in the abrasive composition prior to the heating.

2. The method of claim 1, further comprising forming the abrasive composition.

3. The method of claim 1, further comprising forming the plurality of pore inducers.

4. The method of claim 3, wherein forming the pore inducers further comprises placing a pore inducer starting material composition in a mold, curing the pore inducer starting material composition in the mold, and removing the pore inducers from the mold after the curing.

5. The method of claim 1, wherein the induced pores approximately correspond in size to that of the pore inducers in the abrasive composition prior to the heating.

6. The method of claim 1, wherein the heating comprising vitrifying, wherein the porous abrasive form comprises a porous vitrified abrasive form.

7. The method of claim 1, wherein the pore inducers are about 0.001 wt % to about 50 wt % of the abrasive composition.

8. The method of claim 1, wherein the abrasive composition, further comprises a secondary pore inducer.

* * * * *